US012803979B2

(12) United States Patent
Duffy et al.

(10) Patent No.: US 12,803,979 B2
(45) Date of Patent: Nov. 17, 2026

(54) AUTHENTICATION METHOD AND SYSTEM

(71) Applicant: MASTERCARD INTERNATIONAL INCORPORATED, Purchase, NY (US)

(72) Inventors: Colum Duffy, Richmond (GB); Husham Hamdan, Croydon (GB)

(73) Assignee: Mastercard International Incorporated, Purchase, NY (US)

( * ) Notice: Subject to any disclaimer, the term of this patent is extended or adjusted under 35 U.S.C. 154(b) by 306 days.

(21) Appl. No.: 18/017,051

(22) PCT Filed: Jun. 3, 2021

(86) PCT No.: PCT/US2021/035585
§ 371 (c)(1),
(2) Date: Jan. 19, 2023

(87) PCT Pub. No.: WO2022/020015
PCT Pub. Date: Jan. 27, 2022

(65) Prior Publication Data
US 2023/0300132 A1 Sep. 21, 2023

(30) Foreign Application Priority Data
Jul. 21, 2020 (EP) .................................... 20187073

(51) Int. Cl.
*H04L 9/40* (2022.01)
*H04L 67/141* (2022.01)

(52) U.S. Cl.
CPC ........ *H04L 63/0884* (2013.01); *H04L 63/102* (2013.01); *H04L 67/141* (2013.01)

(58) Field of Classification Search
CPC .. H04L 63/0884; H04L 63/102; H04L 67/141
See application file for complete search history.

(56) References Cited

U.S. PATENT DOCUMENTS 7,272,639 B1 * 9/2007 Levergood .............. H04L 63/10 709/229
8,719,952 B1 5/2014 Goossens
(Continued)

OTHER PUBLICATIONS

International Search Report and Written Opinion—PCT/US2021/035585—ISA/RU—Aug. 26, 2021 (P08967-US-PCT).

*Primary Examiner* — Jeremy S Duffield
(74) *Attorney, Agent, or Firm* — Loza & Loza, LLP

(57) ABSTRACT

A method of authenticating, at an authentication server, a communications session between a user device and a third party device, the method comprising: receiving a connection notification from the third party device, the connection notification indicating the intention of the third party device to initiate a communications session with the user device, the connection notification comprising a user identifier and identification of a communications channel that will be used for the communications session; retrieving a user profile in dependence on the received user identifier, the user profile comprising a user device identifier; generating a communications identifier; sending, to the user device, a communications notification, the communications notification comprising data relating to the communications channel that the third party device will use to connect to the user device, third party identification data and the communications identifier; sending, to the third party device, the communications identifier such that the third party device can include the communications identifier when initiating the communications session with the user device in order to indicate that the communications session is genuine.

12 Claims, 5 Drawing Sheets

(56) References Cited

U.S. PATENT DOCUMENTS

| | | | | |
|---|---|---|---|---|
| 9,203,841 | B2 | 12/2015 | Neuman et al. | |
| 9,525,848 | B2 | 12/2016 | Sinha et al. | |
| 10,298,759 | B1 * | 5/2019 | Ross | H04M 3/5183 |
| 2006/0085417 | A1 | 4/2006 | John et al. | |
| 2007/0255784 | A1 * | 11/2007 | Takechi | H04L 67/14 709/203 |
| 2008/0086764 | A1 | 4/2008 | Kulkarni et al. | |
| 2008/0235511 | A1 | 9/2008 | O'Brien et al. | |
| 2011/0281567 | A1 * | 11/2011 | Moliner | H04L 67/146 455/414.3 |
| 2014/0282984 | A1 * | 9/2014 | Schlesinger | G06F 21/335 726/9 |
| 2015/0026458 | A1 | 1/2015 | Naslund et al. | |
| 2018/0103144 | A1 * | 4/2018 | Gupta | H04M 3/42059 |
| 2019/0075462 | A1 | 3/2019 | Wang et al. | |
| 2019/0394333 | A1 * | 12/2019 | Jiron | G06F 21/32 |
| 2021/0084034 | A1 * | 3/2021 | Gadwale | H04L 63/0861 |
| 2021/0099573 | A1 * | 4/2021 | van Rensburg | H04L 9/0643 |
| 2021/0136209 | A1 * | 5/2021 | Adibi | H04M 3/42102 |

* cited by examiner

AUTHENTICATION METHOD AND SYSTEM

CROSS-REFERENCE TO RELATED APPLICATION(S)

This application is the U.S. national stage of PCT patent application number PCT/US2021/035585 filed on Jun. 3, 2021, which claims priority to and the benefit of European patent application number 20187073.0 filed in the European Patent Office on Jul. 21, 2020, the entire contents of which are incorporated herein by reference as if fully set forth below in their entirety and for all applicable purposes.

TECHNICAL FIELD

The present disclosure relates to an authentication method and system. In particular, the disclosure relates to authenticating a communications session between a third party device and a user device by means of an authentication server. The disclosure relates to a method of authenticating, at an authentication server, a communications session between a user device and a third party device, an authentication server, a method of operating a user device and a method of initiating a communications session from a third party device to a user device.

BACKGROUND

Fraudulent communications, e.g. via email, SMS or phone calls, from fraudsters impersonating a trusted organisation such as a user's bank are often the starting point of a fraud attempt against the user in which a malicious actor attempts to ascertain sensitive information. In the event that the user is tricked into disclosing account and password information then this can allow the fraudster to access a customer's account and, in the example of a bank account, to transfer funds.

Trusted organisations, such as banks, have ways of authenticating users when a user initiates a communication session with the trusted organisation. Such mechanisms include asking a selection of characters from a password or confirming personal information that would only be known to the authentic user. However, users currently have no easy and reliable mechanism to determine if a communication that they have received (e.g. an email, SMS or phone call) is from the trusted organisation or a fraudster. As a result, many organisations advise users to terminate a communications session and for the user to initiate a further communications session via the trusted organisation's website or via another route.

The present disclosure aims to provide an authentication method and system to inform users that a communication they receive from a third party is genuine.

SUMMARY OF THE DISCLOSURE

According to a first aspect of the present disclosure there is provided a method of authenticating, at an authentication server, a communications session between a user device and a third party device, the method comprising: receiving a connection notification from the third party device, the connection notification indicating the intention of the third party device to initiate a communications session with the user device, the connection notification comprising a user identifier and identification of a communications channel that will be used for the communications session; retrieving a user profile in dependence on the received user identifier, the user profile comprising a user device identifier; generating a communications identifier; sending, to the user device, a communications notification, the communications notification comprising data relating to the communications channel that the third party device will use to connect to the user device, third party identification data and the communications identifier; sending, to the third party device, the communications identifier such that the third party device can include the communications identifier when initiating the communications session with the user device in order to indicate that the communications session is genuine.

The present disclosure provides a method enabling a third party device (associated with, for example, a trusted organisation such as a bank) to notify a user device that they are going to initiate a communications session with them. The user device is provided an alert (by means of a communications notification) from the authentication server that a communication from the third party device is expected/about to be initiated. The alert (the communications notification) sent from the server to the user device comprises a communications identifier and third party identification data that allows the user device to identify the third party. [It is noted that the communications identifier is also supplied from the authentication server to the third party device.]

The communications notification received at the user device therefore provides the user device with knowledge of the identity of the third party device (the third party identification data) that will be initiating a communications session and also the means to determine that the session is authenticated (the communications identifier).

When the third party device initiates the communications session (by sending a session request to the user device), the third party device includes the communications identifier within the session request such that the user device can compare it to the communications identifier received from the authentication server. If the identifiers match, then the user device can be confident that the communications session is genuine.

The user identifier contained within the connection notification may be a mobile number associated with the user device, an email address associated with owner of the user device or even the name and/or address details of the user associated with the user device. As described below the user device may also supply a relationship identifier to the third party device and this could be included in the connection notification in addition to or as an example of the user identifier. The authentication server stores or has access to a user profile which comprises a user device identifier. This user profile, containing the user device identifier, is retrieved by the authentication server in order that the authentication server can send the communications identifier on to the user device. The user device identifier may comprise a mobile number where the user device is a mobile device but may comprise an email address associated with the device or details of a secure application running on the user device or other suitable communications identifier that allows the authentication server to send the communications notifier to the user device. As noted below the user profile may comprise further information including, but not limited to, third party devices that the user device has an existing relationship with or information relating to user device preferences, other user configurable preferences or personal information relating to the user of the user device.

Following receipt of a connection notification from the third party device, the authentication server may check that the third party device is registered with the authentication server.

Prior to receiving the connection notification from the third party device, the method comprises receiving verification data relating to the third party device and, on the basis of the verification data, registering the third party device with the authentication server. In order for the user device to determine that the communications session is genuine the third party device may be registered with the authentication server. Such verification may comprise using a secure communications channel to receive verification data from the third party device.

Verification data received from the third party device may comprise some or all of: a legal name of the third party associated with the third party device; contact details for the third party; and, a reference identifier for use in verifying the third party with the authentication server. The reference identifier supplied by the third party device may comprise in the case of a banking entity an Interbank Card Association number (ICA) that can be used to verify the banking entity. Any other suitable reference identifier may be used however.

Registering the third party device may comprise assigning a third party ID to the third party device and issuing the third party device with a digital certificate for use with connection notifications that the third party device subsequently sends to the authentication server.

The authentication server may be arranged to store the verification data, third party ID and digital certificate in a third party profile.

The connection notification may comprise the digital certificate such that the third party device can be authenticated at the authentication server when a connection notification is subsequently sent.

Prior to receiving the connection notification, the authentication server is arranged to receive user data and, on the basis of the received user data, register the user device with the authentication server. The received user data may comprise user contact data (e.g. a mobile number associated with the user device, an email address associated with owner of the user device or the name and/or address details of the user associated with the user device) and third party relationship data. The user contact data may be stored in the user profile as the user device identifier. Where (the user of) a user device has a pre-existing relationship with a third party organisation (e.g. the user's existing banking relationship) then this information may represent the "third party relationship data" that may comprise part of the received user data. Third party relationship data may be used to determine whether to generate a communications identifier following receipt of a connection notification or whether the authentication server needs to send a connection request to the user device first.

The method of operating the authentication server may comprise generating a relationship identifier in dependence on the third party relationship data received during the user device registration process and sending the relationship identifier to the user device. The relationship identifier may take the form of a unique identifier that the authentication server provides to the user device. The user device may then be free to share this relationship identifier with third party organisations that it has a relationship with. The third party device associated with such a third party organisation may then include the relationship identifier within the connection notification that it sends to the authentication server. The presence of the relationship identifier may enable the authentication server to generate the communications identifier without the need to send a connection request to the user device. It is also noted that the relationship identifier may be used as the user identifier that the third party device includes in the connection notification.

The user identifier contained within the connection notification may comprise the relationship identifier. Where the user device has been sent a relationship identifier by the authentication server during the user registration process and has then supplied this relationship identifier to the third party device then the third party device may use the relationship identifier as the means of identifying the user device to the authentication server instead of using another user identifier, e.g. instead of using the user's mobile number.

The authentication server may check for the presence of a relationship identifier that has previously been sent by the authentication server to the user device within the connection notification received from the third party device and, in the event that the relationship identifier is present, the server may proceed to generate the communications identifier.

However, in the event that the relationship identifier is absent from the connection notification, then the method may comprise sending a connection request to the user device in order to check that the user device wishes to accept a communications session from the third party device. The sending of a connection request may be a user configuration option that is set during the registration process.

The method may comprise checking the user profile to determine if the user device has an existing relationship with the third party device and, in the event that such a relationship is absent, sending a connection request to the user device in order to check that the user device wishes to accept a communications session from the third party device. In this way the authentication server checks the known relationships between the user device and third party devices (i.e. between the end user and third parties) before generating the communications notifier that the third party device requires before it can start a trusted communications session with the user device.

The communications channel identified in the connection notification may be any one of: a voice call, a data call, an SMS, an email, postal communication, instant message. The user device may be a mobile telecommunications device.

The communications identifier that is sent from the authentication server may be sent to multiple recipients associated with the user device. This may be useful in instances where the owner of a user device is a vulnerable person and a copy of the communications identifier may be sent to a friend or relative.

The communications identifier may be sent to a communications application installed on the user device, the communications application being configured to communicate over the communications channel identified by the third party device in the connection notification. The authentication server may be integrated into a specific application/program on the user device (e.g. a phone app) and the communications identifier may be output to that app and either checked against the communications notifier supplied by the third party device to determine whether the identifiers match or may be displayed to a user as the communications session is initiated by the third party so that the user can perform a manual check of the communications identifiers received from the server and the third party.

The communications identifier may comprise a validity period and the method may comprise sending details of the validity period to the user device along with the communications identifier. In the event that the third party device fails to initiate a communications session within the validity period then the server may receive a request from the third party to renew the validity period. Alternatively, the server may receive a user communication request from the user device, the request requesting a new validity period for the third party to initiate the communications session. By this means the user device could reschedule a communications session.

According to a further aspect of the present disclosure, there is provided a method of operating a user device configured to communicate with an authentication server and to accept a communications session from a third party device, the method comprising: receiving a communications identifier from an authentication server along with third party identification data and data relating to a communications channel that the third party device will use to connect to the user in the communications session; receiving a session request from the third party device to initiate a communications session, the session request comprising a third party provided communications identifier; determining if the communications identifier received from the authentication server matches the third party provided communications identifier and accepting the session request from the third party device in the event that there is a match.

The communications identifier may be output to a display screen when the session request is received from the third party and a user interface provided which is configured to allow a control input to be entered to either accept or reject the session request. The user device may be configured to store a log of communications identifiers received from the authentication server.

According to a yet further aspect of the present disclosure there is provided a method of initiating a communications session from a third party device to a user device comprising: sending a connection notification from the third party device to an authentication server, the connection notification indicating the intention of the third party device to initiate a communications session with the user device, the connection notification comprising a user identifier and identification of a communications channel that will be used for the communications session; receiving, at the third party device, a communications identifier from the authentication server; initiating a communications session with the user device over the communications channel comprising sending a session request comprising the communications identifier to the user device in order to indicate that the communications session is genuine.

A further communications session may be set up during the communications session between the third party device and the user device. This allows follow up sessions to be arranged in the context of the initial communications session that has been approved by the authentication server.

According to a further aspect of the present disclosure there is provided an authentication server for authenticating a communications session between a user device and a third party device, the server comprising: an input arranged to receive a connection notification from the third party device, the connection notification indicating the intention of the third party device to initiate a communications session with the user device, the connection notification comprising a user identifier and identification of a communications channel that will be used for the communications session; a processor arranged to retrieve a user profile in dependence on the received user identifier, the user profile comprising a user device identifier; generate a communications identifier; and to generate a communications notification, the communications notification comprising data relating to the communications channel that the third party device will use to connect to the user device, third party identification data and the communications identifier; an output arranged to send the communications notification to the user device and to send the communications identifier to the third party device such that the third party device can include the communications identifier when initiating the communications session with the user device in order to indicate that the communications session is genuine.

According to a further aspect of the present disclosure there is provided a user device configured to communicate with an authentication server and to accept a communications session from a third party device, the device comprising: an input arranged to receive: a communications identifier from an authentication server along with third party identification data and data relating to a communications channel that the third party device will use to connect to the user in the communications session; a session request from the third party device to initiate a communications session, the session request comprising a third party provided communications identifier; a processor arranged to determine if the communications identifier received from the authentication server matches the third party provided communications identifier and accept the session request from the third party device in the event that there is a match.

According to a further aspect of the present disclosure there is provided a [third party] device for initiating a communications session with a user device comprising: a processor arranged to generate a connection notification, the connection notification indicating the intention to initiate a communications session with the user device, the connection notification comprising a user identifier and identification of a communications channel that will be used for the communications session; an output arranged to output the connection notification to an authentication server; an input arranged to receive a communications identifier from the authentication server wherein the processor is arranged to initiate a communications session with the user device over the communications channel by outputting a session request comprising the communications identifier to the user device.

The present disclosure extends to a computer program comprising instructions which, when the program is executed by a server, cause the server to carry out a method according to the first aspect of the disclosure.

A computer-readable storage medium comprising instructions which, when executed by a server, cause the server to carry out the method of the first aspect of the disclosure.

The present disclosure extends to a computer program comprising instructions which, when the program is executed by a user device or third party device, cause the user device/third party device to carry out a method according to the second or third aspects of the disclosure respectively.

A computer-readable storage medium comprising instructions which, when executed by a user device or a third party device, cause by the user device or third party device, cause the user device/third party device to carry out a method according to the second or third aspects of the disclosure respectively.

BRIEF DESCRIPTION OF THE DRAWINGS

One or more embodiments of the disclosure will now be described, by way of example only, with reference to the accompanying drawings, in which.

DETAILED DESCRIPTION

General and specific embodiments of the disclosure will be described below with reference to the Figures. It is noted that the terms "user device" and "third party device" are used throughout to refer to both the devices operated by the user and third party and may also be used as a proxy for the user and third party entities.

The present disclosure provides an authentication system and computer-implemented method for providing a user a secure notification to a user device that they are going to be contacted by a third party device associated with the authentication system. Conveniently the user device may be a user's mobile communications device (e.g. a smartphone or tablet or any other suitable internet enabled computing device). The notification received by the user device may additionally be delivered via an existing secure communications program on the user device (e.g. where the third party is a user's bank then the notification may be received via a banking application (app) installed on the user device).

Figure 1:
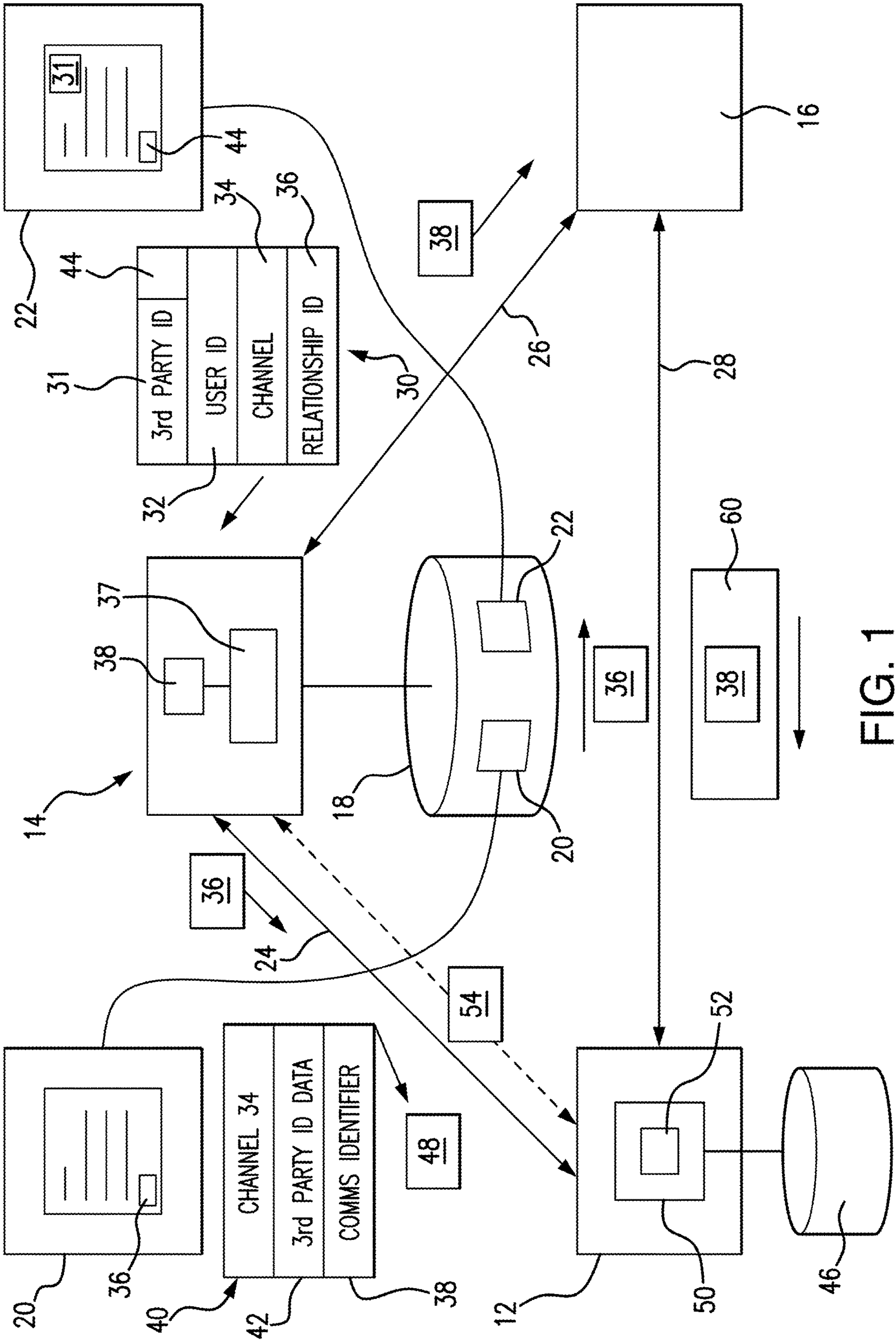
FIG. 1 shows schematically an overview of an authentication system in accordance with an embodiment of the present disclosure.

Turning to FIG. 1, an authentication system 10 is shown comprising a user device 12, an authentication server 14 and a third party computing device 16. The authentication server 14 is in communication with a data store 18 (e.g. a database) which contains a user profile 20 and a third party profile 22.

The system comprises a number of communication channels between the user device 12, server 14 and third party computing device 16. As shown in FIG. 1, there is a user-server communications channel 24, a server-third party communications channel 26 and a third party-user communications channel 28.

The communications channels 24, 26, 28 may comprise data transmission channels (e.g. an email, SMS, instant message or other data communications message) or voice communication channels (e.g. a telephone call) implemented over a suitable communications network, e.g. via the Internet, a mobile communications network. It may be however that one or more of the communications channels comprises a postal communication channel (e.g. the third party may initiate a communication session by writing to the user).

Also shown in FIG. 1 is a connection notification 30 that is sent from the third party computing device 16 to the authentication server 14. This connection notification is arranged to notify the authentication server 14 that the third party intends to initiate a communications session with the user (at their user device 12). The connection notification 30 comprises a third party ID 31, user identifier 32 and data 34 relating to the communications channel 28 that will be used for the communications session.

The user identifier 32 may be a username associated with the user or some other identifier (e.g. an email address, telephone number etc.). The connection notification 30 may further comprise a relationship identifier 36 as detailed below. In some instances, the relationship identifier 36 may take the place of the user identifier 32.

The data 34 relating to the communications channel 28 may be in the form of a channel identifier 34 which comprises an indication of the particular type of communications channel to be used (e.g. an email or SMS communication is to be sent to the user). Additionally, the channel identifier may comprise further information such as a telephone number that will be used by the third party 16 to initiate a communications session by a telephone call or an email address that will be used to send the email from the third party 16 to the user device 12.

The authentication server 14 may comprise a processor 37 that generates a communications identifier 38 to be included by the third party 16 in a session request 60 when initiating the communications session with the user device 12 via the communications channel 28.

As shown in FIG. 1 a communications notification 40 is also sent from the authentication server 14 to the user device 12. The communications notification 40 comprises the communications identifier 38, data 34 relating to the communications channel 28 that the third party will use to initiate the communications session and a third party identification data 42. The third party identification data 42 provides the user/user device 12 with further information about the third party that will be setting up the communications session. This third party identification data 42 may comprise the name of the third party that will be setting up the session (e.g. the name of a banking entity) and/or it may comprise a communications address linked to that third party device (e.g. the telephone number that the third party device will originate from or the email address that the third party will send from). As detailed below in relation to FIG. 2 the communications notification 40 is sent to the user device 12 before the communications session is initiated by the third party 16.

As noted above, the data store 18 comprises a third party profile 22. The third party profile comprises verification data collected from the third party during a registration process with the authentication server 14. This verification data may comprise, some or all of: legal name of the third party, address details for the third party, contact details of key contacts at the third party and a reference identifier (such as an ICA number) that can be used to verify the identity of the third party.

Additionally, the registration process may generate a third party identifier 31 (third party ID) which is unique to the third party and which is included in connection notifications 30 sent from the third party 16 to the authentication server 14 so that the authentication server can identify the third party device 16 and look up the third party profile 22. The third party ID 31 may also be stored within the third party profile 22. The registration process may additionally generate a digital certificate 44 which may be used by the third party 16 to authenticate itself to the authentication server 14. The certificate may be stored within the third party profile 22 and also included within the connection notification 30.

It is noted that the third party ID 31 enables the server 14 to look up the third party profile 22 and retrieve all the data held on the server for that third party device 16. The digital certificate 44 enables the third party device 16 to be authenticated at the server 14. It is noted that in some system configurations the certificate 44 could be used to look up the third party profile 22 instead of using a third party ID 31.

The data store 18, as noted above, additionally comprises a user profile 20. A user registration process may be used to populate a user's profile with user data and third party relationship data, i.e. details of organisations that the user identifies that they have a pre-existing relationship with (a user may for example specify the identity of their bank, their utility provider, their mobile service provider etc.).

The user profile 20 may comprise a relationship identifier 36 that has been generated by the authentication server 14 and supplied to the user 12. The user device may store this relationship identifier 36 in a data store 46 of the user device 12 and the user may supply this relationship identifier 36 to third parties when the user initiates a relationship with the third party, e.g. the user may choose to send the relationship identifier 36 to select third parties such as the user's bank.

Third parties in possession of the user's relationship identifier 36 may include this within their connection notifications 30 such that the authentication server 14 can determine that the third party has an existing relationship with the user. In some circumstances the relationship identifier 36 may take the place of a user identifier 32 in the connection notification 30 and the third party 16 may use the relationship identifier 36 as the means of identifying the user to the authentication server 14 instead of another user identifier 32 such as a mobile telephone number or email address.

The authentication server 14 may, in advance of sending a communications notification 40 to the user device 12 send a connection request 48 to check whether the user wishes to accept a future communications session from the third party 16.

The connection request 48 may be configured differently according to different user preferences. For example, a user may request that the authentication server 14 always send a connection request 48 to the user device 12 prior to generating a connection notification 40 (and prior to generating a communications identifier 38). In such a configuration the user (via the user device 12) may effectively screen all potential communications sessions with third parties before the third party is ever authorised to initiate such a session by the authentication server. In alternative configurations the authentication server 14 may be configured to send a connection request 48 if the user profile 20 does not include an entry indicating an existing relationship with the third party wishing to set up the communications session or if the connection notification 30 does not include a relationship identifier 36 for the user.

In the event that a connection request 48 is sent to the user device 12 the user may send an approval or rejection message 54 to the authentication server 14.

Communications received on the user device 12 from the authentication server 14 and from the third party 16 may be processed by a processor 50 on the user device 12. The processor may additionally run a secure communications program (a communications application) 52 that can process the received communications.

The communications identifier 38 may be time limited with a contact period that the third party 16 should initiate the communication session with the user device 12 such that, if the period expires, the third party 16 is required to request a new contact period in order to initiate the communications session.

Figure 2:
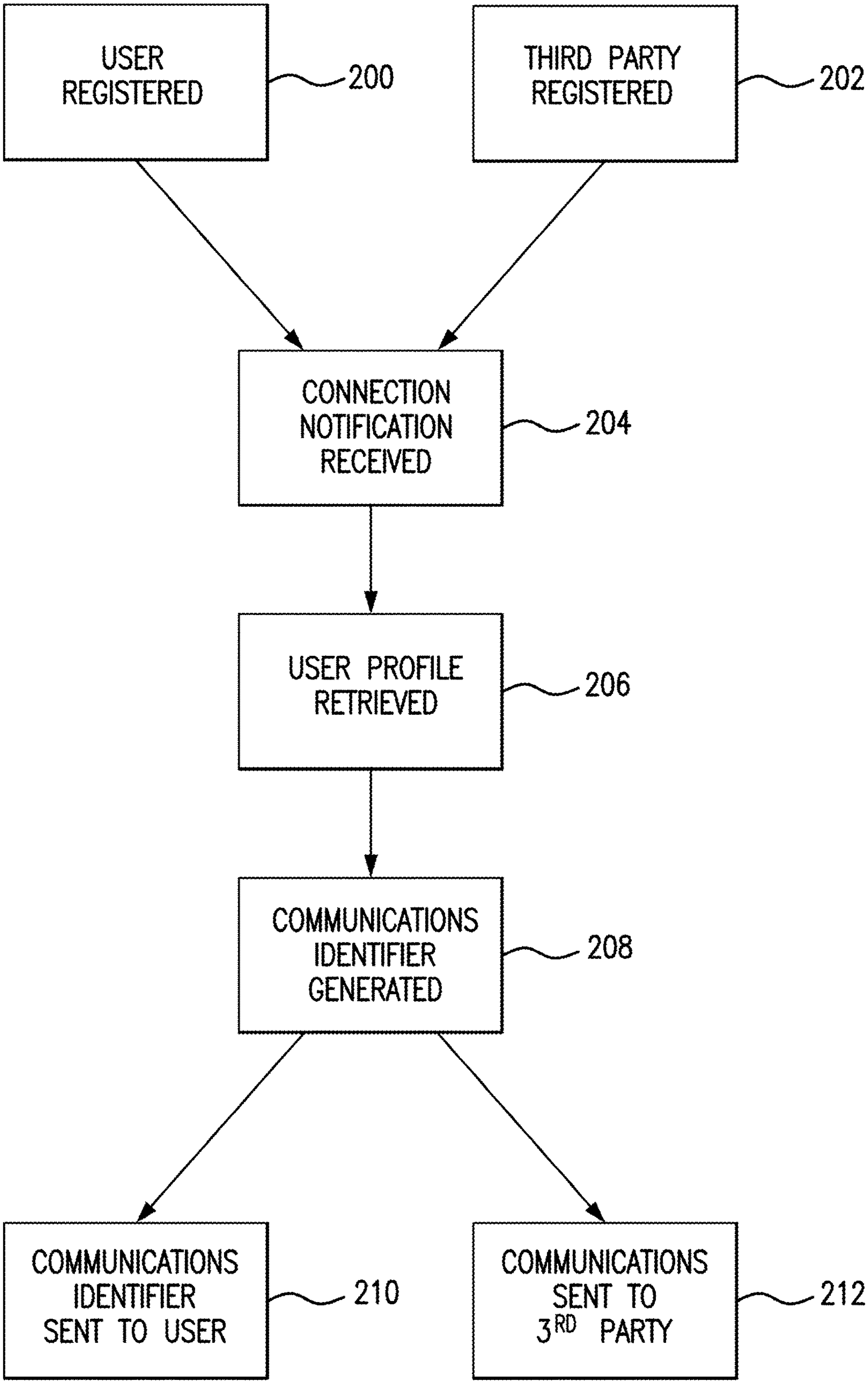
FIG. 2 is a flow chart of method of operation of the system of FIG. 1.
Figure 3:
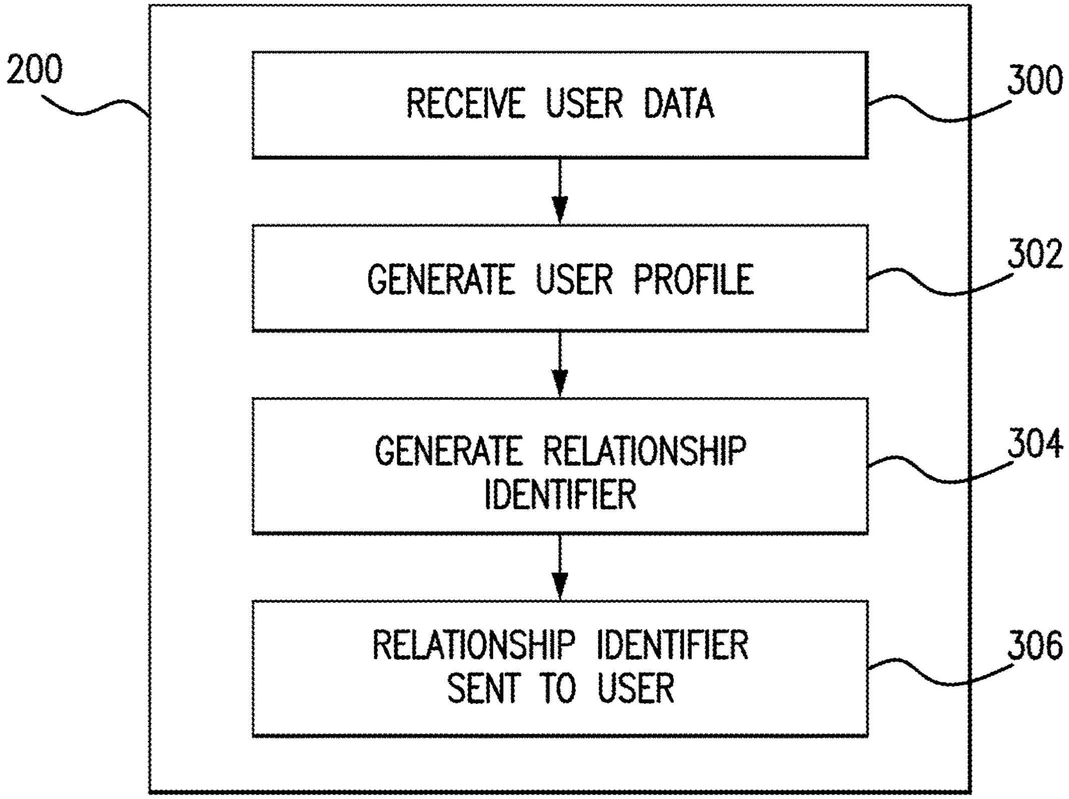
FIG. 3 shows user device registration process of FIG. 2 in more detail.
Figure 4:
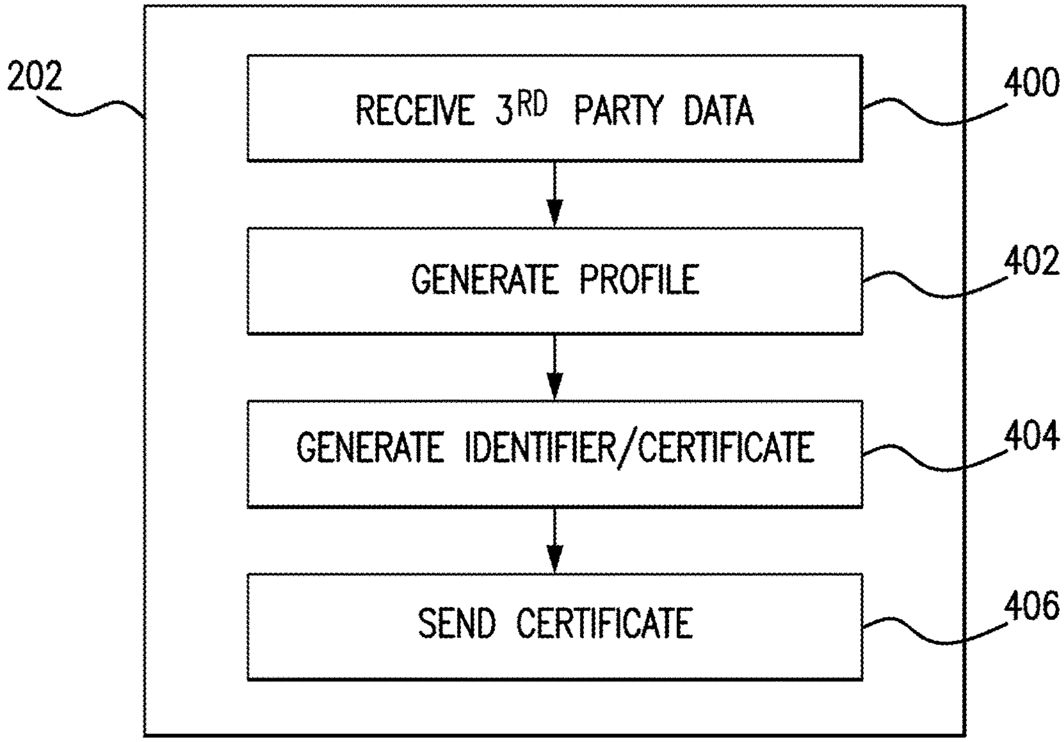
FIG. 4 shows the third party device registration process of FIG. 2 in more detail.
Figure 5:
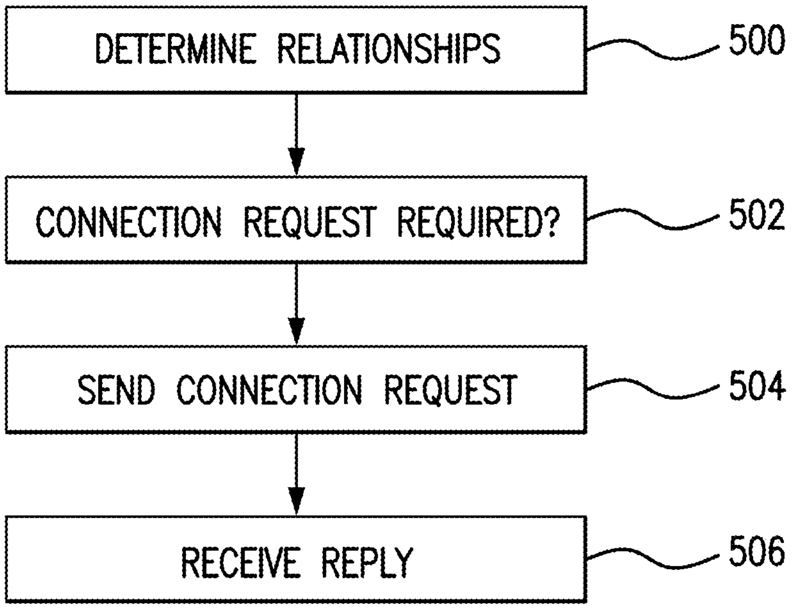
FIG. 5 shows the process of checking the connection notification received in FIG. 2 in more detail.

FIG. 2 shows a (computer-implemented) method of operating an authentication server 14 according to an embodiment of the present invention. FIGS. 3, 4 and 5 show some of the steps of FIG. 2 in more detail.

In step 200 a user is registered with the authentication server 14. As shown in FIG. 3, step 200 may comprise, at step 300, receiving user data comprising user contact data and third party relationship data for the user (as noted above the user may provide details of organisations that they have a pre-existing relationship with). In step 302, the authentication server 14 generates a user profile 20 from the received user data. In step 304, the server 14 is arranged to generate one or more relationship identifiers 36 in response to receiving third party relationship data from the user. It is noted that the server 14 may generate a single relationship identifier 36 that may be supplied as described below to any third party that has a relationship with the user. Alternatively, the server 14 may generate relationship identifiers 36 for each third party that has a relationship with the user. The relationship identifier(s) 36 may be stored in the user profile along with received user data. In step 306, the relationship identifier(s) 36 may be sent to the user. Such relationship identifier(s) 36 may then subsequently be supplied, by the user, to the corresponding third party as noted above for use when the third party intends to initiate a communications session with the user.

In step 202, a third party 16 registers with the authentication server 14. As shown in FIG. 4, step 202 may comprise, at step 400, receiving third party data from the third party device 16, the third party data comprising the legal name of the third party entity and contact details for the third party. In step 402, the authentication server 14 generates a third party profile 22 from the received third party data. In step 404, the server 14 is arranged to generate a third party identifier 31 and a digital certificate 44 and to store these in the profile 22. In step 406 the third party ID 31 and digital certification 44 are sent to the third party device 16 for use by the third party when it sends a connection request.

In step 204, the authentication server 14 receives a connection notification 30 from the third party device 16, the connection notification 30 comprising: the third party ID 31, a user identifier 32 and data 34 relating to the communications channel 28 that the third party wishes to use for the communications session with the user device 12. The connection notification 30 may further contain the relationship identifier 36 (if supplied by the user to the third party).

In step 206, the authentication server retrieves the user profile and checks the received connection notification 30 against the retrieved user profile 20. For example, the authentication server 14 can look up the communication preferences of the user from their user profile 20 and can determine whether to continue with step 208 on the basis of the user's stated preferences. The authentication server 14 may optionally carry out the additional steps discussed below in relation to FIG. 5 before proceeding to step 208. The authentication server 14 also retrieves a user device identifier from the user profile that will later enable it to send the communications identifier to the user device.

In step 208, the authentication server generates a communications identifier 38. The communications identifier 38 is a unique reference number that will be used to validate the communications session between the user and the third party. The identifier 38 may be a unique alphanumeric code or may be generated based on the information received from the third party device 16 in the connection notification 30. The communications identifier 38 may be time limited such that it defines a validity period to the user device during which the third party device 16 will initiate a communications session. If the third party fails to initiate a communications session during this time period then the third party device 16 may be required to send a further connection notification 30 in order for the authentication server 14 to generate a new communications identifier 38.

In step 210 the authentication server 14 sends a communications notification 40 to the user device 12, the communications notification 40 comprising the communications identifier 38 and the data 34 relating to the communications channel that the third party is going to use when it initiates the communications session between the third party and the user device 12.

In step 212 the communications identifier 38 is sent to the third party device 16. The third party device 16 is subsequently arranged to include the communications identifier 38 when it initiates a communication session with the user device 12 such that the user device 12 can compare the communications identifier 38 received from the authentication server 14 with the one received from the third party 16.

As noted above the authentication server 14 may perform additional steps, e.g. verifying the presence of an existing relationship between the third party device 16 and the user device 12, between steps 206 and 208. These optional additional steps are shown in FIG. 5. It is noted that some or all of these additional steps may be taken depending on the particular configuration of the authentication system.

In step 500 the authentication server 14, upon receiving the connection notification 30 from the third party device 16, and verifying the identity of the third party device using the third party ID 31/digital certificate 44, may then determine if the user device 12 has an existing relationship with the third party device 16. The server 14 may determine this by retrieving the user profile 22 relating to the user ID 32 specified in the connection notification 30 and look up from the user profile 22 if the user device 12 has an existing relationship with the third party device 16. Alternatively, or additionally, the server 14 may look for the presence of a relationship identifier 36 within the connection notification 30 which would indicate that the user device 12 had supplied the identifier 36 to the third party device 16 in order to indicate that they were willing to initiate communications sessions with the third party device 16.

In step 502 the authentication server 14 may check whether a connection request 48 should be sent to the user device 12 to determine whether they approve or reject initiating a connection session with the third party device 16. It is noted that the step of sending a connection request may be a general requirement of the authentication system or may be an option that the user device 12 can configure during the user registration process.

In step 504, where a connection request 48 is required, the authentication server 14 sends the request 48 to the user device 12 and, in step 506, the server 14 receives a reply 54 indicating whether the user device 12 consents accepting a communications session from the third part device 16.

In the event that the user device 12 consents to the communications session then the authentication server 14 moves on to step 208.

It is noted that all the communications received at the user device 12 from the authentication server 14 and from the third party 16 may be processed by a processor 50 on the user device 12. The processor may additionally run a secure communications program (a communications application) 52 that can process the received communications.

Figure 6:
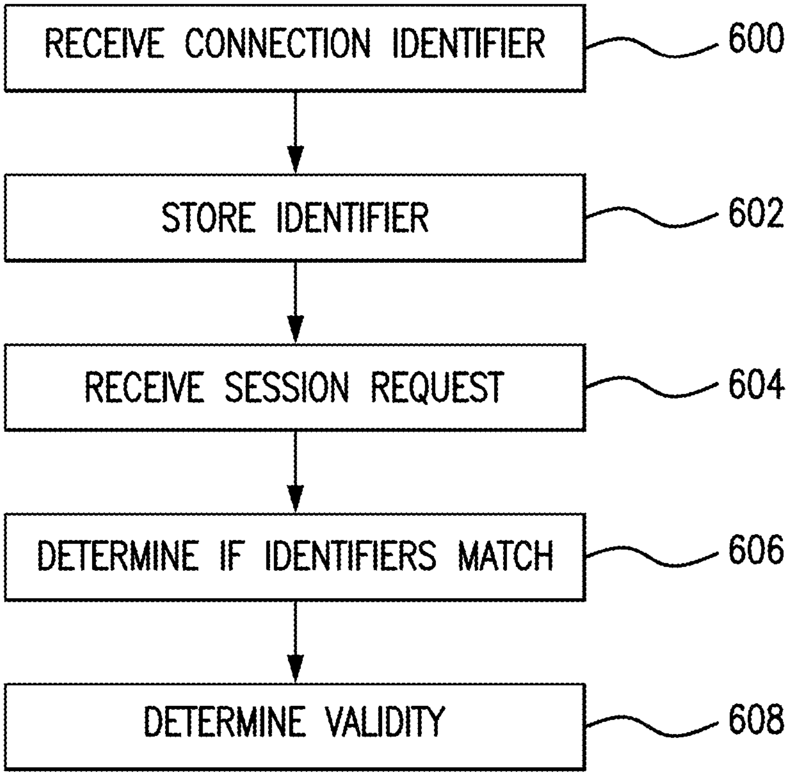
FIG. 6 shows a method of operating a user device in accordance with an embodiment of the present disclosure.

FIG. 6 relates to a (computer-implemented) method of using a user device 12 in an authentication system as shown in FIG. 1 in accordance with embodiments of the present disclosure.

In step 600 the user device 12 receives a communications identifier 38 from an authentication server 14.

In step 602 the communications identifier 38 is stored in a data store 46 of the user device 12.

In step 604 the user device 12 receives a request, a session request 60, to accept a communications session from a third party device 16. The session request 60 comprises a communications identifier 38.

In step 606 the processor 50 at the user device 12 determines if the communications identifier received from the authentication server matches the communications identifier received from the third party device 16. In the event that the two identifiers match then the session request can be determined to originate from a verified third party (i.e. a third party who is registered with the authentication server 14 and who has requested and received a valid communications identifier 38 from the server 14).

In step 608 the user device 12 may indicate the validity of the session request to the user of the user device 12. In a configuration where the user device comprises a secure application 52 then the acceptance of the communications session may be handled by the secure application 52 and the user presented with an indication (e.g. an onscreen message) that the communications session has been preauthorised by the authentication server 14. In an alternative configuration the user device 12 (or processor 50 or secure application 52) may skip step 606 and instead display an "answer/ignore" option to the user via a display on the user device 12 along with a message showing the received communications identifiers (one from the server 14 and one from the third party device 16) so that the user can accept the call once they have performed a check of the two received identifiers. In a further alternative configuration the user device 12 may display the communications identifier 38 received from the server 14 and the third party device 16 may provide the communications identifier as part of the communications session so that the user device 12 (or user) can check the two identifiers match. For example, where the communications session relates to a voice call then a person at the third party device 16 could verbally provide the communications identifier such that the user device 12 (or associated user) could manually check the identifiers match.

Figure 7:
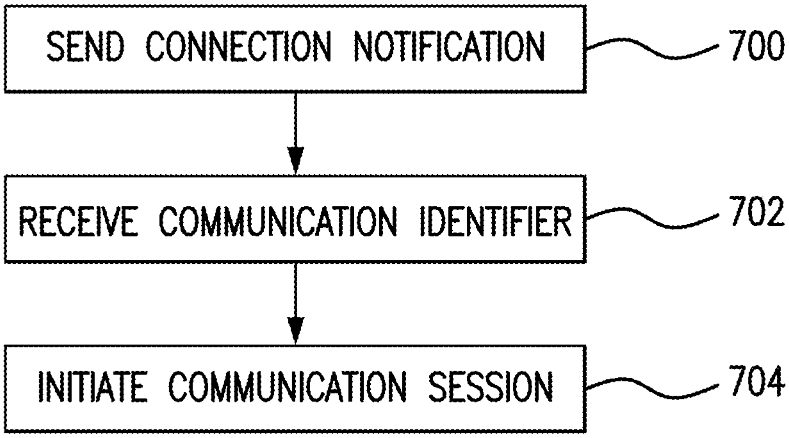
FIG. 7 shows a method of operating a third party device in accordance with an embodiment of the present disclosure.

FIG. 7 relates to a (computer-implemented) method of using a third party device 16 in an authentication system as shown in FIG. 1. In step 700 the third party device is arranged to send a connection notification 30 to the authentication server 14, the connection notification indicating the intention of the third party to initiate a communications session with the user and comprising a user identifier 32, identification 34 of a communications channel that will be used for the communications session and a third party ID 31 and/or a digital certificate 44. The connection notification may additionally comprise a relationship identifier 36 as described above.

In step 702, the third party device 16 receives a communications identifier 38 from the authentication server 14 (once the authentication server 14 has run through the verification steps discussed above in FIGS. 2 to 5).

In step 704, the third party device 16 initiates a communications session with the user over the communications channel by sending a session request 60 to the user that comprises the communications identifier 38. The communications identifier 38 is included in the request 60 in order to indicate that the communications session is genuine.

The invention claimed is:

1. A method of authenticating, at an authentication server, a communications session between a user device and a third party device, the method comprising:

generating a relationship identifier in dependence on third party relationship data received from the user device, the third party relationship data including identity information about at least one third party organization having a pre-existing relationship with a user associated with the user device, the third party device being associated with one of the at least one third party organization;

sending the relationship identifier to the user device;

receiving a connection notification from the third party device, the connection notification indicating an intention of the third party device to initiate the communications session with the user device, the connection notification comprising a user identifier and identification of a communications channel that will be used for the communications session;

retrieving a user profile in dependence on the received user identifier, the user profile comprising a user device identifier;

checking for a presence of the relationship identifier that has previously been sent by the authentication server to the user device within the connection notification received from the third party device;

generating a communications identifier for validating the communications session between the user device and the third party device, in response to the presence of the relationship identifier within the connection notification;

sending, to the user device, a communications notification, the communications notification comprising data relating to the communications channel that the third party device will use to connect to the user device, third party identification data and the communications identifier including the relationship identifier in dependence upon the third party relationship data; and sending, to the third party device, the communications identifier such that the third party device can include the communications identifier including the relationship identifier in dependence upon the third party relationship data when initiating the communications session with the user device in order to indicate that the communications session is genuine.

2. A method as claimed in claim 1, wherein, following receipt of the connection notification from the third party device the method further comprises checking that the third party device is registered with the authentication server.

3. A method as claimed in claim 1, wherein, prior to receiving the connection notification from the third party device, the method further comprises receiving, verification data relating to the third party device and, on the basis of the verification data, registering the third party device with the authentication server.

4. A method as claimed in claim 1, wherein prior to receiving the connection notification, the method comprises receiving user data and, on the basis of the received user data, registering the user device with the authentication server.

5. A method as claimed in claim 4, wherein the received user data comprises user contact data and the third party relationship data.

6. A method as claimed in claim 5, wherein the user identifier contained in the connection notification comprises the relationship identifier.

7. A method as claimed in claim 1, comprising checking the user profile to determine if the user device has an existing relationship with the third party device and, in the event that such a relationship is absent, sending a connection request to the user device in order to check that the user device wishes to accept the communications session from the third party device.

8. A method as claimed in claim 1, further comprising sending the communications identifier to multiple recipients associated with the user device.

9. A method as claimed in claim 1, further comprising sending the communications identifier to a communications application installed on the user device, the communications application configured to communicate over the communications channel identified by the third party device in the connection notification.

10. A method as claimed in claim 1, wherein the communications identifier comprises a validity period and the method comprises sending the validity period to the user device along with the communications identifier.

11. An authentication server for authenticating a communications session between a user device and a third party device, the authentication server comprising:

means for generating a relationship identifier in dependence on third party relationship data received from the user device, the third party relationship data including identity information about at least one third party organization having a pre-existing relationship with a user associated with the user device, the third party device being associated with one of the at least one third party organization;

means for sending the relationship identifier to the user device;

means for receiving a connection notification from the third party device, the connection notification indicating an intention of the third party device to initiate the communications session with the user device, the connection notification comprising a user identifier and identification of a communications channel that will be used for the communications session;

means for retrieving a user profile in dependence on the received user identifier, the user profile comprising a user device identifier;

means for checking for a presence of the relationship identifier that has previously been sent by the authentication server to the user device within the connection notification received from the third party device;

means for generating a communications identifier for validating the communications session between the user device and the third party device, in response to the presence of the relationship identifier within the connection notification;

means for sending, to the user device, a communications notification, the communications notification comprising data relating to the communications channel that the third party device will use to connect to the user device, third party identification data and the communications identifier; and means for sending, to the third party device, the communications identifier such that the third party device can include the communications identifier when initiating the communications session with the user device in order to indicate that the communications session is genuine.

12. An authentication server comprising:

a memory storing instructions; and a processor configured to execute the instructions to:

generate a relationship identifier in dependence on third party relationship data received from the user device, the third party relationship data including identity information about at least one third party organization having a pre-existing relationship with a user associated with the user device, the third party device being associated with one of the at least one third party organization;

send the relationship identifier to the user device;

receive a connection notification from the third party device, the connection notification indicating an intention of the third party device to initiate the communications session with the user device, the connection notification comprising a user identifier and identification of a communications channel that will be used for the communications session;

retrieve a user profile in dependence on the received user identifier, the user profile comprising a user device identifier;

check for a presence of the relationship identifier that has previously been sent by the authentication server to the user device within the connection notification received from the third party device;

generate a communications identifier for validating the communications session between the user device and the third party device, in response to the presence of the relationship identifier within the connection notification;

send, to the user device, a communications notification, the communications notification comprising data relating to the communications channel that the third party device will use to connect to the user device, third party identification data and the communications identifier; and send, to the third party device, the communications identifier such that the third party device can include the communications identifier when initiating the communications session with the user device in order to indicate that the communications session is genuine.

* * * * *